(12) United States Patent
James et al.

(10) Patent No.: US 9,869,053 B2
(45) Date of Patent: Jan. 16, 2018

(54) HEATER ASSEMBLY FOR AN APPLIANCE

(75) Inventors: Alexander Daniel James, Louisville, KY (US); Stephen Bernard Froelicher, Shepherdsville, KY (US); Richard Dustin Henderson, Louisville, KY (US); Ionelia Silvia Prajescu, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 1181 days.

(21) Appl. No.: 13/567,310

(22) Filed: Aug. 6, 2012

(65) Prior Publication Data

US 2014/0034631 A1    Feb. 6, 2014

(51) Int. Cl.
*H05B 1/02* (2006.01)
*F24H 3/04* (2006.01)
*F24H 9/20* (2006.01)
*G01K 1/14* (2006.01)
*G01K 1/20* (2006.01)
*G01K 13/02* (2006.01)
*D06F 58/26* (2006.01)
*D06F 58/28* (2006.01)
*F24H 9/00* (2006.01)

(52) U.S. Cl.
CPC ............ *D06F 58/26* (2013.01); *D06F 58/28* (2013.01); *F24H 9/0063* (2013.01); *H05B 1/0252* (2013.01); *H05B 1/0272* (2013.01); *D06F 2058/289* (2013.01); *F24H 3/0405* (2013.01); *F24H 3/0411* (2013.01); *F24H 9/0057* (2013.01); *G01K 2013/024* (2013.01); *H05B 2203/022* (2013.01); *H05B 2203/036* (2013.01)

(58) Field of Classification Search
None
See application file for complete search history.

(56) References Cited

U.S. PATENT DOCUMENTS

| 2,621,423 | A | * | 12/1952 | Clark | 34/546 |
|---|---|---|---|---|---|
| 2,697,164 | A | * | 12/1954 | Knapp et al. | 392/368 |
| 2,782,991 | A | * | 2/1957 | Allen | 236/10 |
| 2,941,308 | A | * | 6/1960 | Cobb et al. | 34/552 |
| 2,988,626 | A | * | 6/1961 | Buttner | F24H 3/0411 |
| | | | | | 219/213 |
| 3,147,368 | A | * | 9/1964 | Walker | F04D 17/04 |
| | | | | | 165/122 |
| 3,718,982 | A | * | 3/1973 | Deaton | 34/82 |
| 4,518,847 | A | * | 5/1985 | Horst, Sr. | F24H 9/2071 |
| | | | | | 126/101 |
| 5,329,098 | A | * | 7/1994 | Howard et al. | 219/532 |
| 6,087,636 | A | * | 7/2000 | Faries, Jr. | A61B 46/10 |
| | | | | | 219/429 |
| 6,091,888 | A | * | 7/2000 | Jane | F24H 9/2071 |
| | | | | | 219/518 |
| 6,169,850 | B1 | * | 1/2001 | Menassa | 392/350 |
| 7,149,416 | B2 | * | 12/2006 | Nawrot et al. | 392/350 |
| 7,560,667 | B2 | * | 7/2009 | Kammer | A61M 3/0245 |
| | | | | | 219/430 |

(Continued)

*Primary Examiner* — Joseph M Pelham
(74) *Attorney, Agent, or Firm* — Dority & Manning P.A.

(57) ABSTRACT

A heater assembly for an appliance is provided. The heater assembly includes a housing and a thermostat. The housing defines an aperture. The thermostat includes a probe that is positioned adjacent the aperture. The aperture can increase the accuracy of temperature measurements by the thermostat and hinder unnecessary tripping of the thermostat.

18 Claims, 7 Drawing Sheets

(56) References Cited

U.S. PATENT DOCUMENTS

| | | | | |
|---|---|---|---|---|
| 8,138,454 B2* | 3/2012 | Kammer | ............ | G05D 23/1909 |
| | | | | 219/430 |
| 8,148,666 B2* | 4/2012 | Faries, Jr. | .............. | A61B 46/10 |
| | | | | 219/429 |
| 8,153,937 B2* | 4/2012 | Faries | .................... | A61B 50/10 |
| | | | | 219/429 |
| 8,309,891 B2* | 11/2012 | Kammer | ............ | A61M 3/0245 |
| | | | | 219/432 |
| 8,555,522 B2* | 10/2013 | Bellinger et al. | ............... | 34/549 |
| 8,787,738 B2* | 7/2014 | Mulder | ......................... | 392/347 |
| 2006/0034593 A1* | 2/2006 | Rapoza | ......................... | 392/350 |
| 2008/0205481 A1* | 8/2008 | Faries et al. | .................. | 374/138 |
| 2012/0110869 A1* | 5/2012 | Bellinger et al. | ............... | 34/427 |
| 2014/0041849 A1* | 2/2014 | Mulder | ......................... | 165/259 |

\* cited by examiner

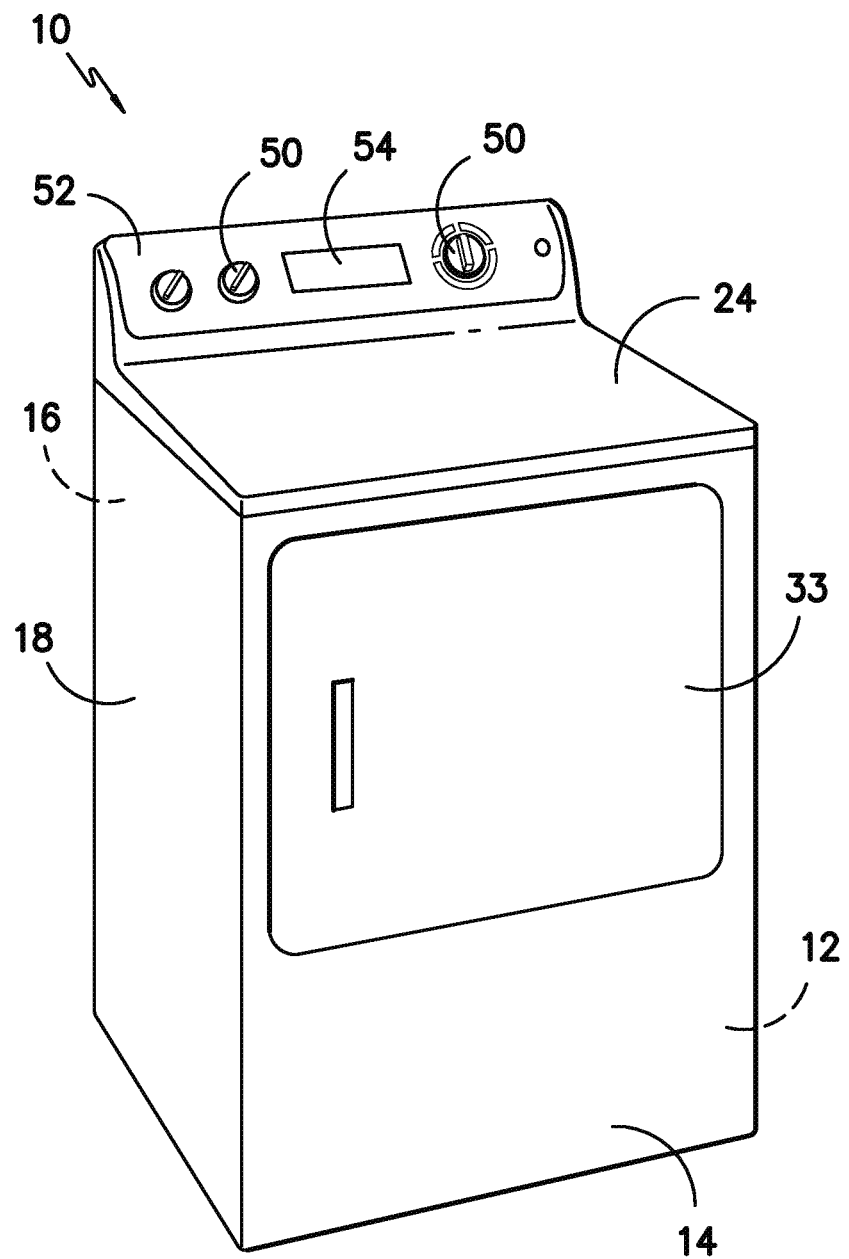
FIG. -1-

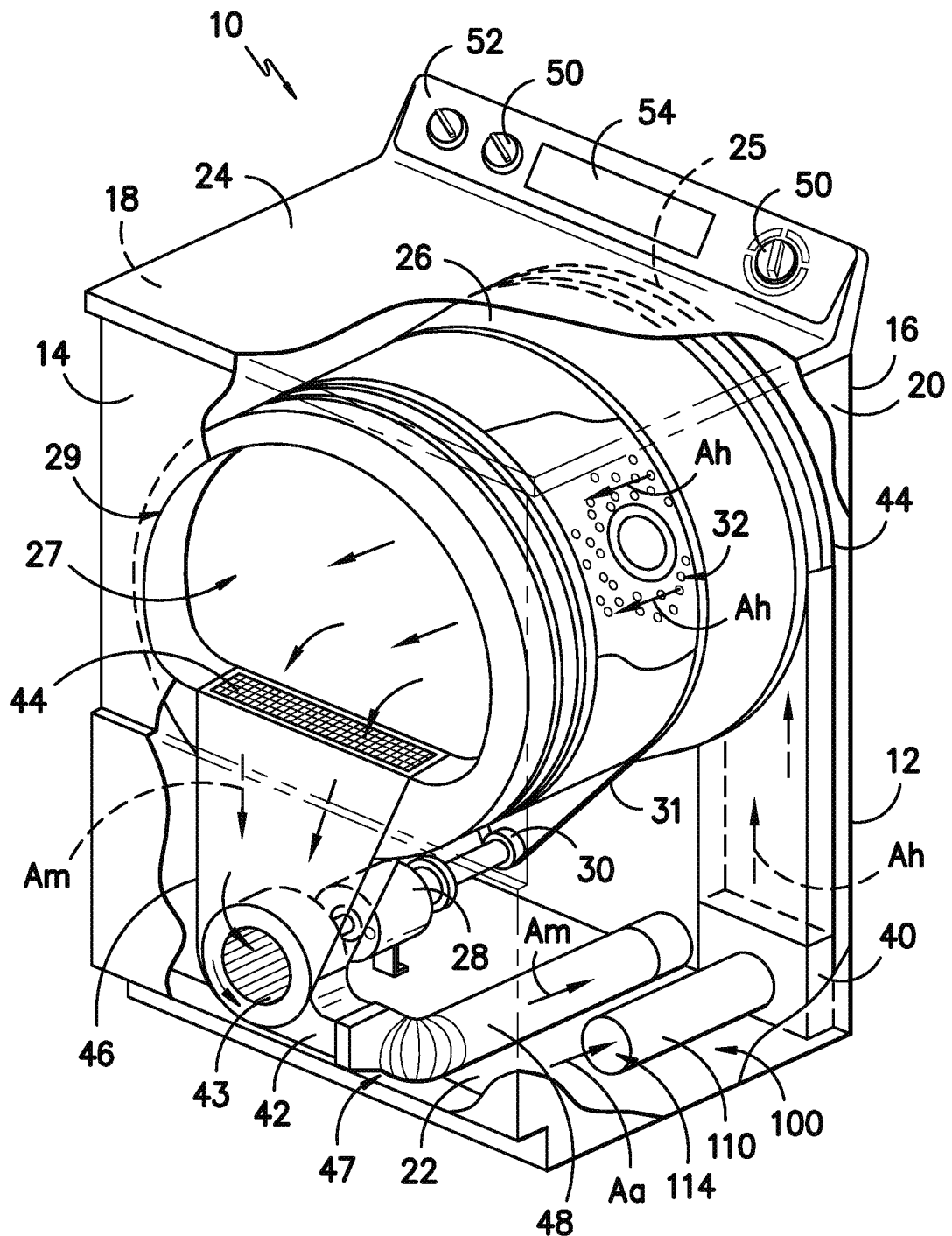
FIG. -2-

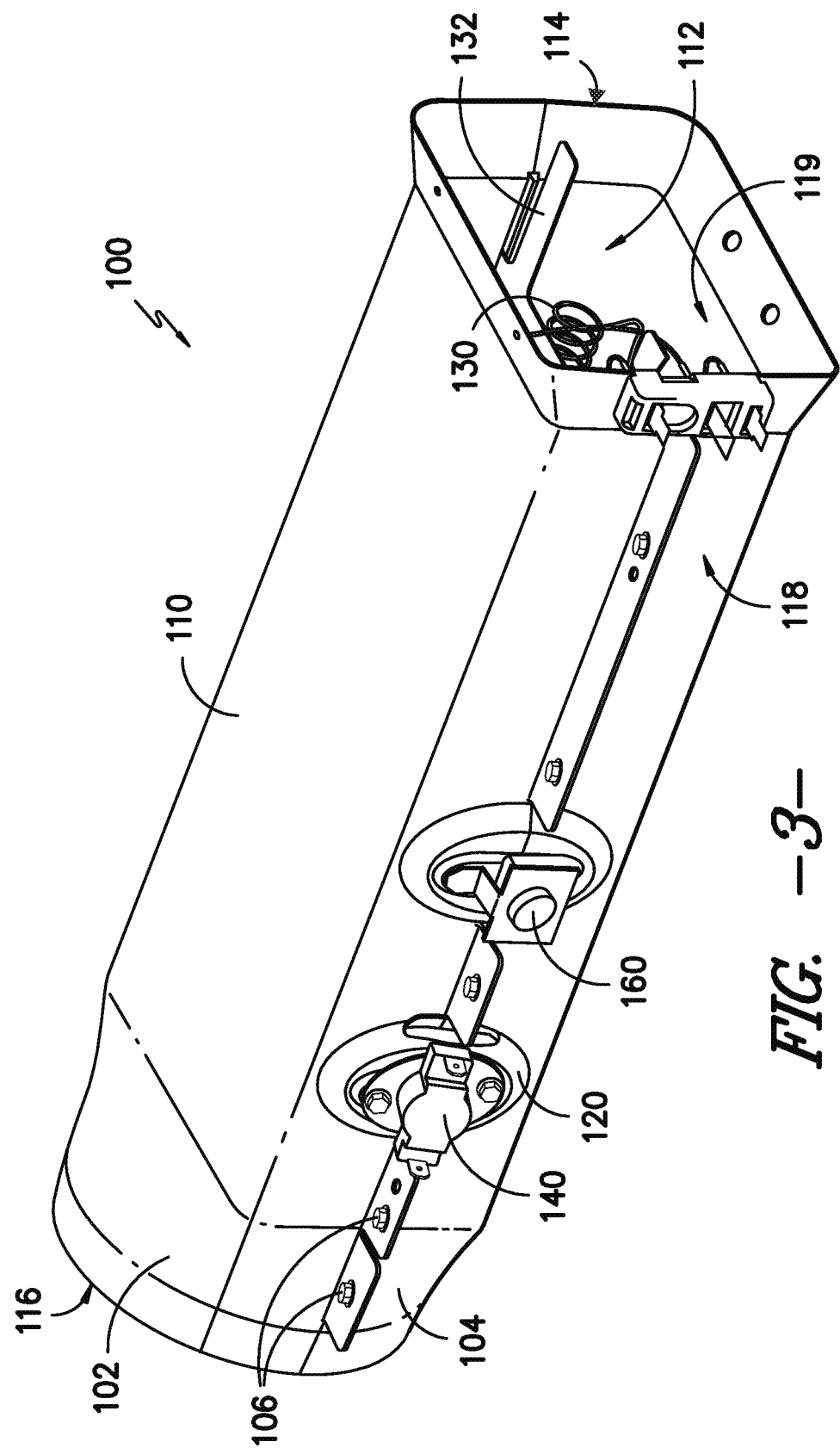
FIG. -3-

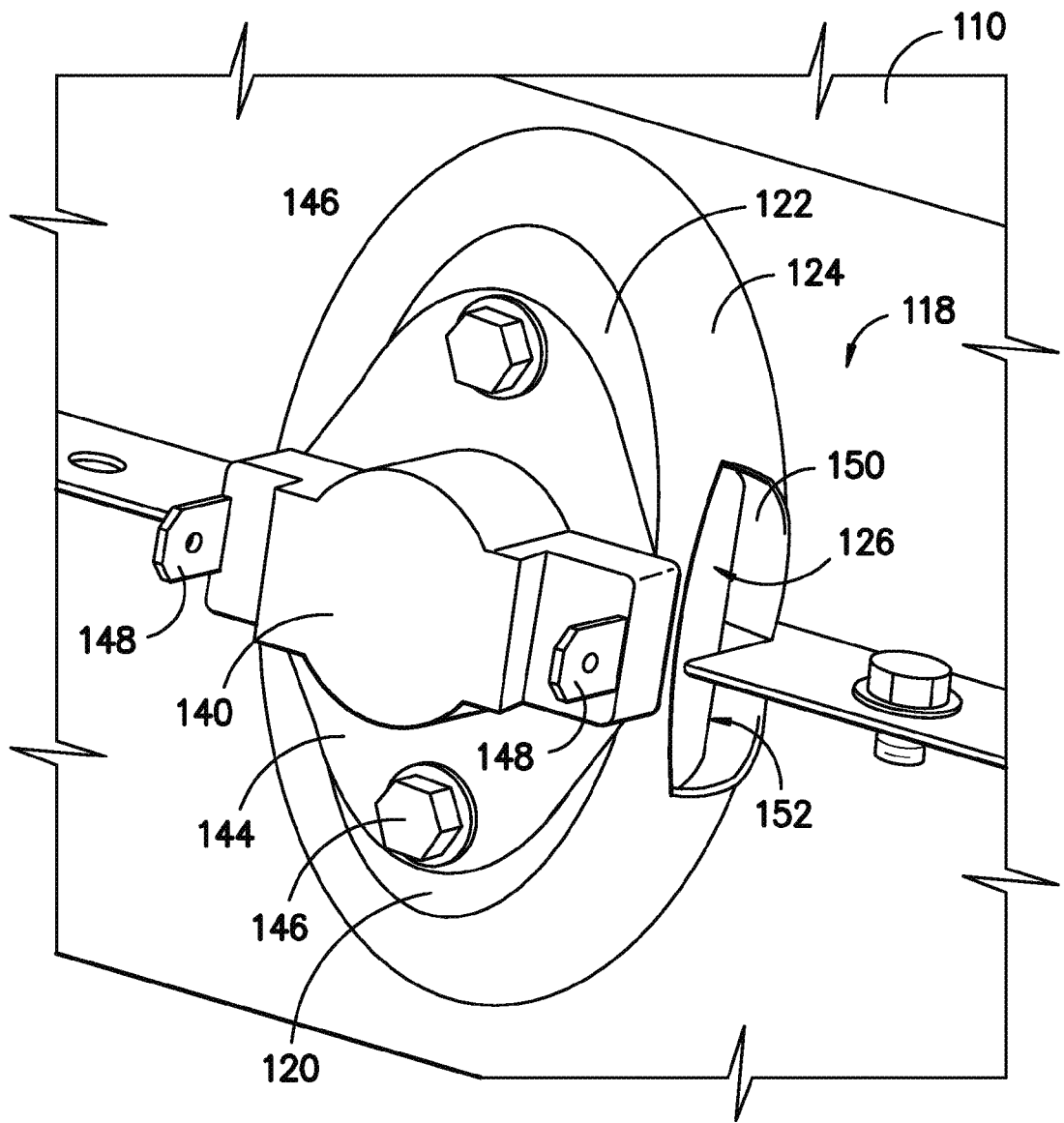
FIG. —4—

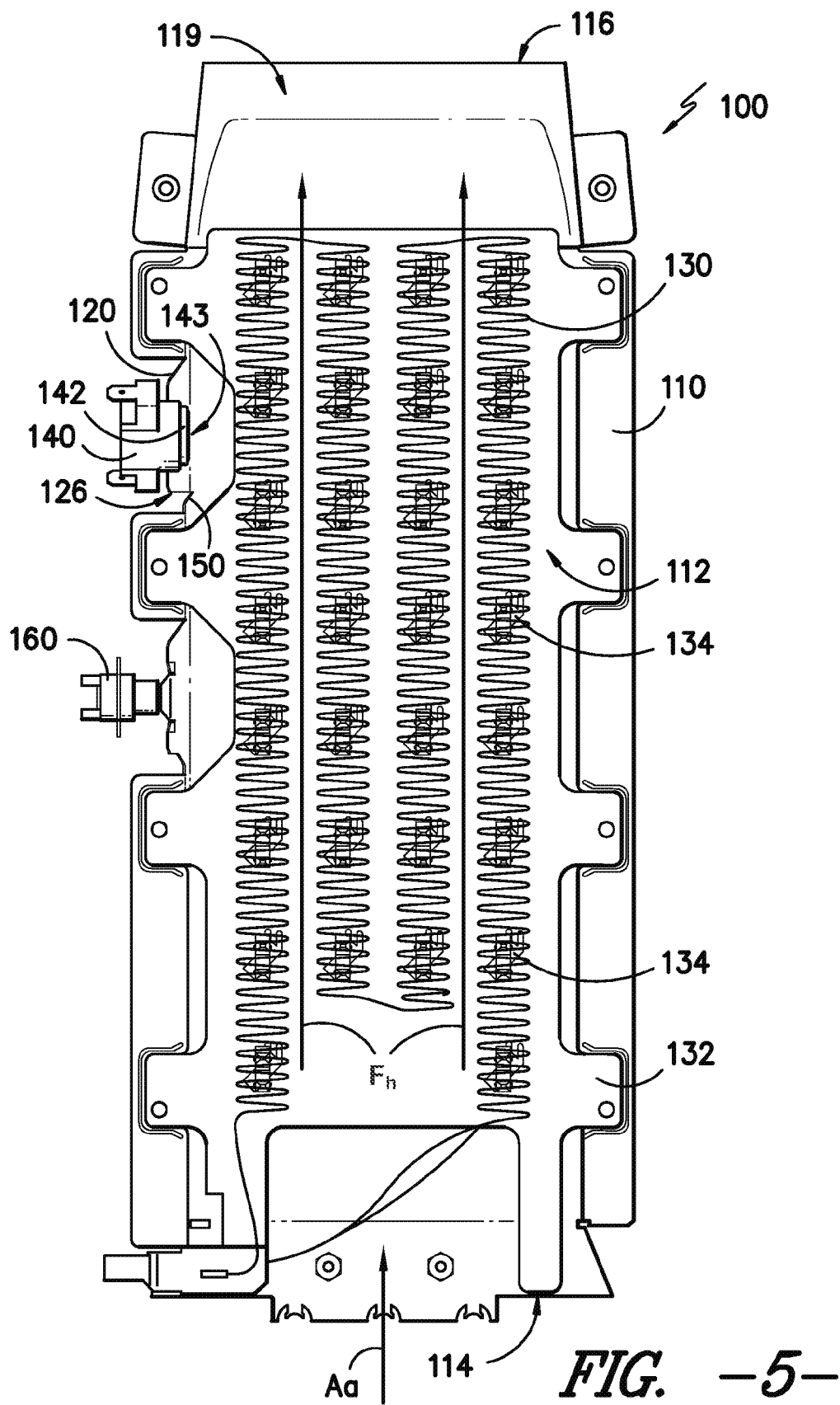
FIG. -5-

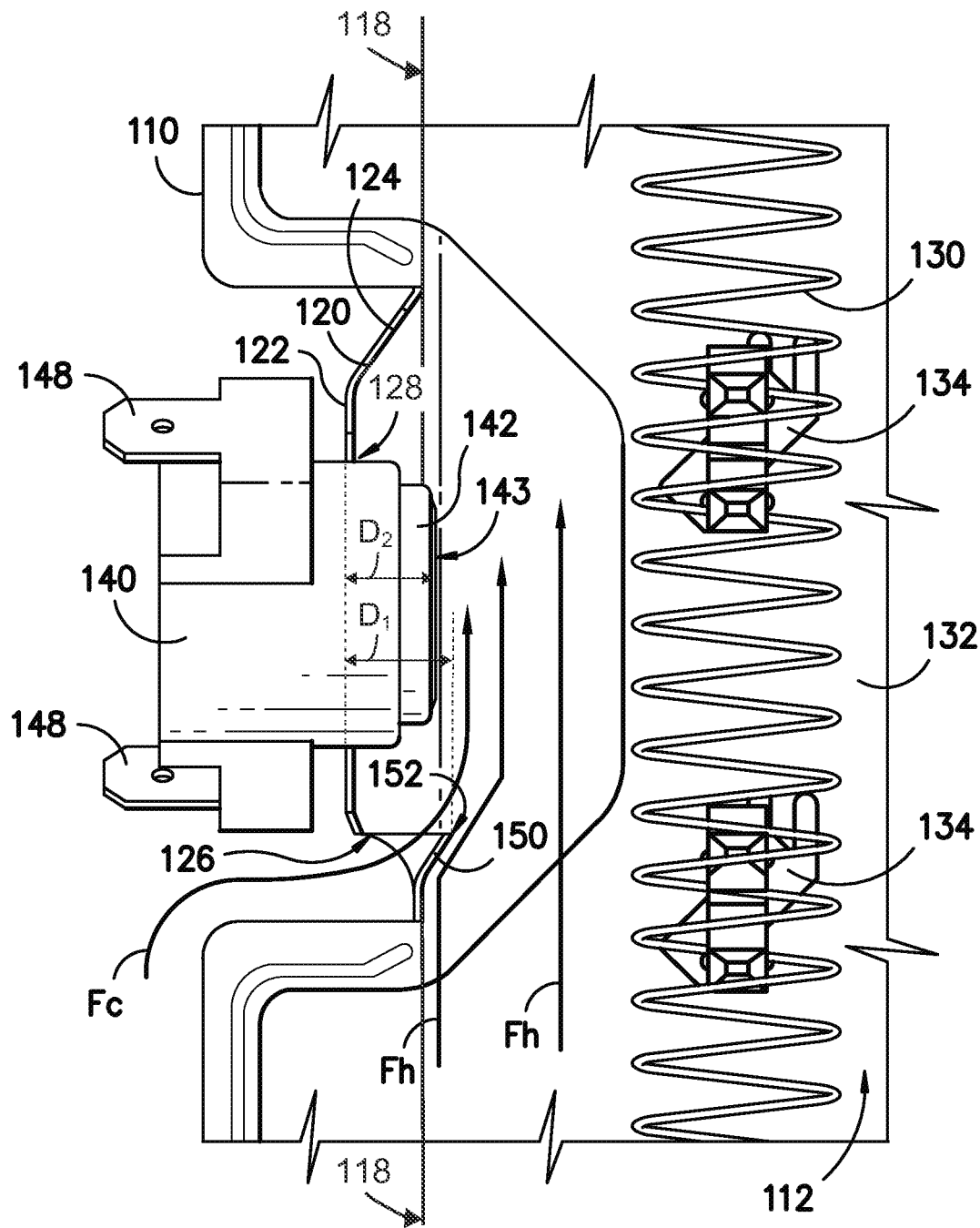
FIG. -6-

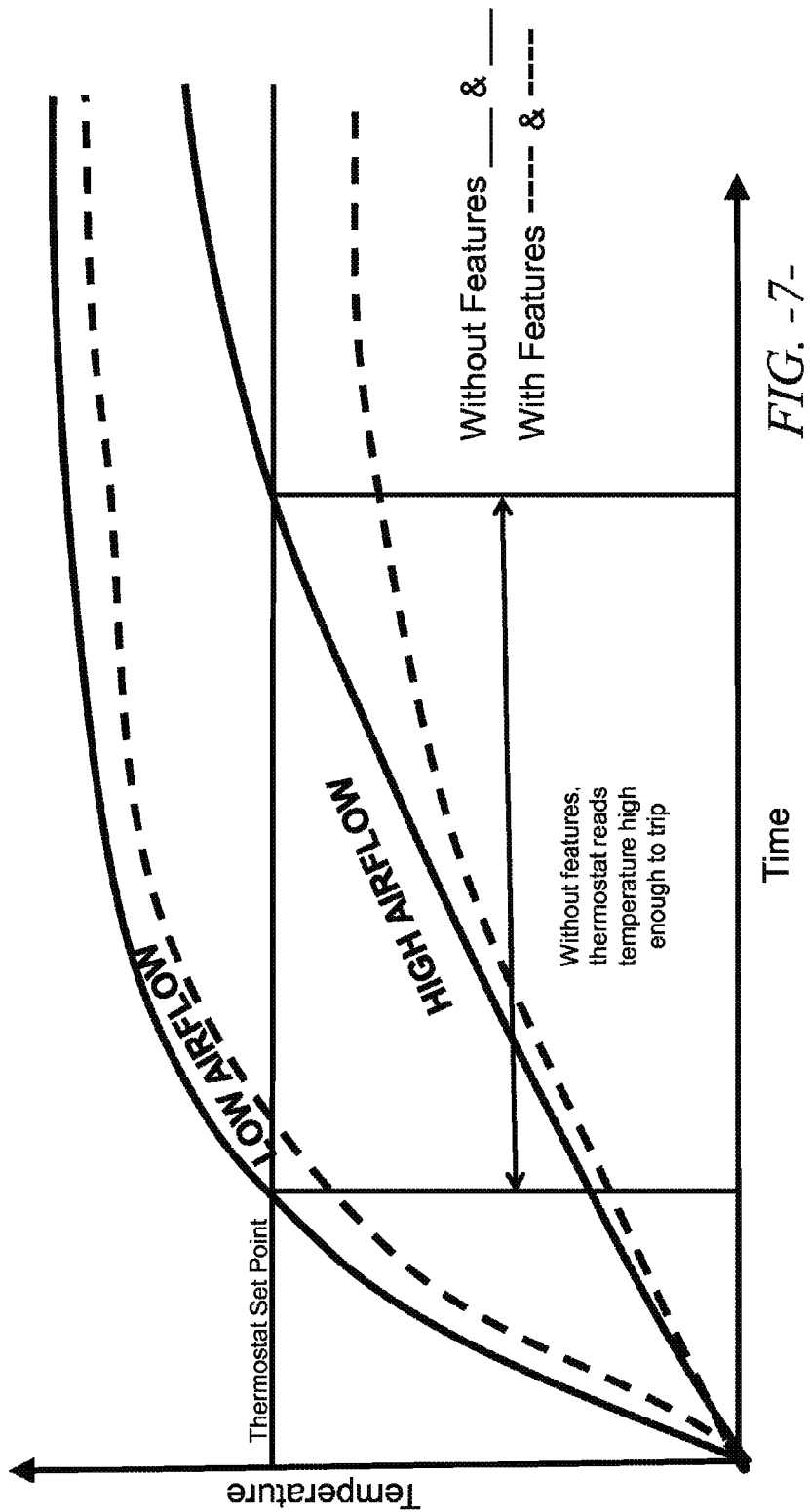
FIG. -7-

HEATER ASSEMBLY FOR AN APPLIANCE

FIELD OF THE INVENTION

The present subject matter relates generally to heater assemblies for appliances, e.g., dryer appliances or oven appliances.

BACKGROUND OF THE INVENTION

Dryer appliances generally include a cabinet with a drum rotatably mounted therein. Dryer appliances also generally include a heater assembly that passes heated air through the drum in order to dry moisture laden articles disposed within the drum. The temperature of heated air generated by the heater assembly can be monitored and regulated with a thermostat. In particular, the thermostat can be configured to trip and terminate further temperature increases within the heater assembly at a set point or temperature, e.g., in order to hinder or prevent the heater assembly from overheating.

However, the temperature measured by the thermostat can lag behind the actual temperature of the heated air when there is poor airflow through the heater assembly and the heater assembly is rapidly increasing in temperature. In order to compensate for such lag, the set point can be fixed at a value lower than the desired steady state temperature of the heater assembly. Conversely, when there is good airflow through the heater assembly and the thermostat does not need to trip, the thermostat reaches the set point and terminates further temperature increases within the heater assembly despite the heater assembly not operating at the desired steady state temperature.

Accordingly, a heater assembly with features for more accurately measuring a temperature of heated air within the heater assembly would be useful. In particular, a heater assembly with features for hindering unnecessary thermostat tripping would be useful.

BRIEF DESCRIPTION OF THE INVENTION

The present subject matter provides a heater assembly for an appliance. The heater assembly includes a housing and a thermostat. The housing defines an aperture. The thermostat includes a probe that is positioned adjacent the aperture. The aperture can increase the accuracy of temperature measurements by the thermostat and hinder unnecessary tripping of the thermostat. Additional aspects and advantages of the invention will be set forth in part in the following description, or may be apparent from the description, or may be learned through practice of the invention.

In a first exemplary embodiment, a heater assembly for an appliance is provided. The heater assembly includes a housing that defines a chamber. The housing also defines an inlet and an outlet. The chamber of the housing extends from the inlet of the housing to the outlet of the housing. The housing also has an outer surface and an embossment with a distal portion. The embossment of the housing extends away from the outer surface of the housing such that the distal portion of the embossment is positioned away from the outer surface of the housing. The embossment of the housing has a sidewall that extends between and connects the outer surface of the housing and the distal portion of the embossment. The sidewall of the embossment defines an aperture. A heating element is disposed within the chamber of the housing. The heating element is configured for heating air that enters the housing at the inlet of the housing in order to generate a flow of heated air that exits the housing at the outlet of the housing. A thermostat is mounted to the housing and has a probe. The probe of the thermostat is positioned within the chamber of the housing. The probe of the thermostat also positioned proximate the aperture of the embossment.

In a second exemplary embodiment, a heater assembly for an appliance is provided. The heater assembly includes a housing that defines a chamber. The housing also defines an inlet and an outlet. The chamber of the housing extends from the inlet of the housing to the outlet of the housing. The housing further defines an aperture. A louver is positioned at the aperture of the housing and extends into the chamber of the housing. A heating element is disposed within the chamber of the housing. The heating element is configured for heating air that enters the housing at the inlet of the housing in order to generate a flow of heated air that exits the housing at the outlet of the housing. A thermostat is mounted to the housing and has a probe. The probe of the thermostat is positioned within the chamber of the housing. The probe of the thermostat also positioned proximate the aperture of the housing.

In a third exemplary embodiment, a heater assembly for an appliance is provided. The heater assembly includes a housing that defines a chamber. The housing also defines an inlet and an outlet. The chamber of the housing extends from the inlet of the housing to the outlet of the housing. A heating element is disposed within the chamber of the housing. The heating element is configured for heating air that enters the housing at the inlet of the housing in order to generate a flow of heated air that exits the housing at the outlet of the housing. A thermostat is mounted to the housing and has a probe. The probe of the thermostat is positioned within the chamber of the housing. The heater assembly also including means for directing the flow of heated air away from the probe of the thermostat.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of a dryer appliance according to an exemplary embodiment of the present subject matter. The dryer appliance includes a cabinet.

FIG. 2 provides a perspective view of the dryer appliance of FIG. 1 with a portion of the cabinet removed to reveal internal components of the dryer appliance. In particular, a heater assembly according to an exemplary embodiment of the present subject matter is revealed.

FIG. 3 provides a perspective view of the heater assembly of FIG. 2.

FIG. 4 is a perspective view of an embossment of the heater appliance of FIG. 3. In FIG. 4, an exemplary embodiment of an aperture defined by the embossment is also shown.

FIG. 5 illustrates a sectional view of the heater assembly of FIG. 2.

FIG. 6 provides a sectional view of the embossment of the heater assembly of FIG. 5. In FIG. 6, an exemplary embodiment of a louver may also be seen.

FIG. 7 illustrates plots of temperature versus time for the heater assembly. In FIG. 7, plots are provided for high and low airflow, with and without the louver.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to but need not be limited to fabrics, textiles, garments (or clothing), and linens. Furthermore, the term "load" or "laundry load" refers to the combination of articles that may be washed together in a washing machine or dried together in a laundry dryer (i.e., a clothes dryer) and may include a mixture of different or similar articles of different or similar types and kinds of fabrics, textiles, garments and linens within a particular laundering process.

FIGS. 1 and 2 illustrate a dryer appliance 10 according to an exemplary embodiment of the present subject matter. While described in the context of a specific embodiment of dryer appliance 10, using the teachings disclosed herein it will be understood that dryer appliance 10 is provided by way of example only. Other dryer appliances having different appearances and different features may also be utilized with the present subject matter as well. Also, as will be understood by those skilled in the art using the teachings disclosed herein, the present subject matter may be used with other appliances and as well, e.g., convection oven appliances.

Dryer appliance 10 includes a cabinet 12 having a front panel 14, a rear panel 16, a pair of side panels 18 and 20 spaced apart from each other by front and rear panels 14 and 16, a bottom panel 22, and a top cover 24. Within cabinet 12 is a drum or container 26 mounted for rotation about a substantially horizontal axis. Drum 26 is generally cylindrical in shape and defines a chamber 27 for receipt of articles for drying. For example, dryer appliance 10 shown in FIGS. 1 and 2 is an electric dryer appliance with electrical heating elements. However, in alternative exemplary embodiments, dryer appliance 10 may be a gas dryer appliance with gas heating elements (e.g., gas burners) for heating air.

Drum 26 defines an opening 29 for permitting access to the chamber 27 of drum 26. Thus, opening 29 of drum 26, e.g., permits loading and unloading of clothing articles and other fabrics from chamber 27 of drum 26. A door 33 is rotatably mounted at opening 29 and selectively hinders access to chamber 27 of drum 26 through opening 29.

Drum 26 includes a rear wall 25 rotatably supported within cabinet 12 by a suitable fixed bearing. Rear wall 25 can be fixed or can be rotatable. A motor 28 rotates the drum 26 about the horizontal axis through a pulley 30 and a belt 31. Motor 28 is also in mechanical communication with an air handler 42 such that motor 28 rotates a fan assembly 43, e.g., a centrifugal fan assembly, of air handler 42. Air handler 42 is configured for drawing air through chamber 27 of drum 26, e.g., in order to dry articles located therein as discussed in greater detail below. In alternative exemplary embodiments, dryer appliance 10 may include an additional motor (not shown) for rotating fan assembly 43 of air handler 42 independently of drum 26.

Drum 26 is configured to receive heated air that has been heated by a heater assembly 100, e.g., in order to dry damp articles disposed within chamber 27 of drum 26. Heater assembly 100 includes a housing 110. As discussed above, during operation of dryer appliance 10, motor 28 rotates drum 26 and fan assembly 43 of air handler 42 such that air handler 42 draws air through chamber 27 of drum 26 when motor 28 rotates fan assembly 43. In particular, ambient air, shown with arrow $A_a$, enters housing 110 of heater assembly 100 via an inlet 114 due to air handler 42 urging such ambient air $A_a$ into inlet 114. Such ambient air $A_a$ is heated within housing 110 and exits housing 110 as heated air, shown with arrow $A_h$, as discussed in greater detail below. Air handler 42 draws such heated air $A_h$ through a back duct 40 to drum 26. The heated air $A_h$ enters drum 26 through a plurality of holes 32 defined in rear wall 25 of drum 26.

Within chamber 27, the heat air $A_h$ can accumulate moisture, e.g., from damp articles disposed within chamber 27. In turn, air handler 42 draws moisture statured air, shown as arrow $A_m$, through a screen filter 44 which traps lint particles. Such moisture statured air $A_m$ then enters a front duct 46 and is passed through air handler 42 to an exhaust duct 48. From exhaust duct 48, such moisture statured air $A_m$ passes out of clothes dryer 10 through a vent 49 defined by cabinet 12.

A cycle selector knob 50 is mounted on a cabinet backsplash 52 and is in communication with a controller 54. Signals generated in controller 54 operate motor 28 and heater assembly 100 in response to a position of selector knob 50. Alternatively, a touch screen type interface may be provided. As used herein, "processing device" or "controller" may refer to one or more microprocessors or semiconductor devices and is not restricted necessarily to a single element. The processing device can be programmed to operate dryer appliance 10. The processing device may include, or be associated with, one or memory elements such as e.g., electrically erasable, programmable read only memory (EEPROM).

FIG. 3 provides a perspective view of heater assembly 100 removed from dryer appliance 10. As discussed above, heater assembly 100 includes housing 110. As may be seen in FIG. 3, housing 110 includes an upper housing portion 102 and a bottom housing portion 104. Upper housing portion 102 and lower housing portion 104 are secured together with fasteners 106 to form housing 110.

Housing 110 defines a chamber 112. Housing 110 also defines inlet 114 and an outlet 116. Inlet 114 and outlet 114 are longitudinally spaced apart from one another on housing 110 such that inlet 114 and outlet 114 are disposed on opposite ends of housing 110. The chamber 112 of housing 110 extends between inlet 114 of housing 110 and outlet 116 of housing 110 such that inlet 114 and outlet 116 are in fluid communication via chamber 112. Thus, inlet 114 of housing 110 and outlet 116 of housing 110 permit fluid, e.g., air, to flow through chamber 112 of housing 110. For example, as discussed above, air handler 42 (FIG. 2) can draw ambient air $A_a$ into chamber 112 of housing 110 through inlet 114 of housing 110. Within chamber 112, such ambient air $A_a$ can be heated and exit chamber 112 of housing 110 through outlet 116 of housing 110 as heated air $A_h$.

Housing 110 also has an outer surface 118 and an inner surface 119. An embossment or projection 120 is mounted to housing 110 and extends away from outer surface 118 of housing 110. A thermostat 140 is mounted to embossment 120, and an additional thermostat 160 is mounted to housing 110 upstream of thermostat 140. Thermostat 140 is discussed in greater detail below.

FIG. 4 is a perspective view of embossment 120. As may be seen in FIG. 4, embossment 120 has a distal portion 122. Embossment 120 extends away from outer surface 118 of housing 110 such that distal portion 122 of embossment 120 is spaced apart from outer surface 118 of housing 110. Embossment 120 has a sidewall 124 that extends between and connects outer surface 118 of housing 110 and distal portion 124 of embossment 124. Sidewall 124 of embossment 120 defines an aperture 126.

As discussed above, thermostat 140 is mounted to embossment 120 of housing 110. In particular, thermostat 140 includes a support 144. In FIG. 4, support 144 is shown as a circular plate. However, in alternative exemplary embodiments, support 144 may have any suitable shape. At least one fastener 146 extends through support 144 of thermostat 140 into embossment 120 in order to mount thermostat 140 to embossment 120.

Thermostat 140 is configured for measuring a temperature of air within chamber 112 of housing 110. Thus, thermostat can include, e.g., a thermocouple, thermistor, or resistance temperature detector. Thermostat 140 may be placed in communication with controller 54 (FIG. 1) such that controller 54 receives a voltage and/or current from thermostat 140 corresponding to the temperature of air within chamber 112 of housing 110. In particular, thermostat 140 includes a pair of blade connections 148 that may receive a wire or other suitable electrical conductor to place controller 54 and thermostat 140 in electrical communication.

FIG. 5 illustrates a sectional view of heater assembly 100. As may be seen in FIG. 5, a heating element 130 is disposed within chamber 112 of housing 110. Heating element 130 is mounted to a plate 132 with brackets 134. In turn, plate 132 is mounted or secured to housing 110 between upper housing portion 102 (FIG. 2) and lower housing portion 104 (FIG. 2).

Heating element 130 is configured for heating air, e.g., ambient air $A_a$, that enters chamber 112 of housing 110 at inlet 114 of housing 110 in order to generate a flow of heated air, shown with arrows $F_h$. Flow of heated air $F_h$ exits chamber 112 of housing 110 at outlet 116 of housing 110, e.g., as heated air $A_h$ discussed above. In FIG. 5, heating element 130 is shown as an electrical resistance heating element. However, in alternative exemplary embodiments, heating element 130 may be any suitable type of heating element, e.g., a gas burner, or combination of heating elements.

As may be seen in FIG. 5, thermostat 130 includes a probe 142. Probe 142 of thermostat 140 is positioned within chamber 112 of housing 110. Probe 142 of thermostat 140 is exposed to air (e.g., heated air) within chamber 112 of housing 110. Thus, e.g., a thermocouple within probe 142 of thermostat 140 can generate a voltage that corresponds to the temperature of the air within chamber 112 adjacent probe 142. Such voltage can be received by controller 63 (FIG. 1) in order to control dryer appliance 10 (FIG. 1) operations.

FIG. 6 provides a sectional view of heater assembly 100 adjacent embossment 120. As may be seen in FIG. 6, distal portion 122 of embossment 120 defines an opening 128. Thermostat 140 extends through opening 138 of distal portion 122 into chamber 112 of housing 110 such that probe 142 of thermostat 140 is positioned within chamber 112. Probe 142 of thermostat 140 is also positioned proximate aperture 126 of embossment 120. Further, aperture 126 of embossment 120 is disposed upstream of probe 142 of thermostat 140 relative to the flow of heated air $F_h$ through chamber 112 of housing 110.

As may be seen in FIG. 6, a louver 150 is positioned at aperture 126 of embossment 120 and extends into chamber 112 of housing 110. In particular, louver 150 has a distal end 152. Distal end 152 of louver 150 is positioned within chamber 112 of housing 110 a first distance $D_1$ from distal portion 122 of embossment 120. Similarly, probe 142 of thermostat 140 has a distal part 143. Distal part 143 of probe 142 is positioned within chamber 112 of housing 110 a second distance $D_2$ from distal portion 122 of embossment 120. In FIG. 6, first distance $D_1$ is greater than second distance $D_2$. However, in alternative exemplary embodiments, first distance $D_1$ may be equal to or less than second distance $D_2$.

Features of heater assembly 100 described above can increase accuracy of temperature measurements by thermostat 140 and/or hinder unnecessary tripping thermostat 140. In particular, aperture 126 and louver 150 can increase accuracy of temperature measurements by thermostat 140 and/or hinder unnecessary tripping of thermostat 140. As an example, aperture 126 can permit a flow of cooling air $F_c$ to flow into chamber 112 of housing 110, e.g., when air is flowing though chamber 112 of housing 110. During operation of heater assembly 100 (e.g., when heating elements 130 are active), flow of cooling air $F_c$ can have a temperature that is less than that of flow of heated air $F_h$. Within chamber 112, flow of cooling air $F_c$ can flow across probe 142 of thermostat 140 and/or direct flow of heated air $A_h$ away from probe 142 of thermostat 140 by forming a film of cooler air over probe 142. Thus, aperture 126 can hinder heating of probe 142, e.g., when air handler 42 is urging the flow of heated air $F_h$ through chamber 112. Similarly, louver 150 directs flow of heated air $A_h$ away from probe 142 of thermostat 140 as shown in FIG. 6. In particular, distal end 152 of louver 150 is positioned with chamber 112 of housing 110 such that louver 150 deflects the flow of heated air $F_h$ through chamber 112 of housing 110 away from probe 142 of thermostat 140. By deflecting flow of heated air $F_h$, louver 150 can hinder flow of heated air $F_h$ from impacting probe 142 of thermostat 140 and thus hinder heating of probe 142, e.g., when air handler 42 is urging the flow of heated air $F_h$ through chamber 112.

FIG. 7 illustrates plots of temperature versus time for heater assembly 100. FIG. 7 is provided by way of example only and is not intended to limit the present subject matter in any aspect. In particular, FIG. 7 provides plots for high and low volume airflows, with and without features (e.g., aperture 126 and/or louver 150) for directing flow of heated air $F_h$ away from probe 142 of thermostat 140.

Thermostat 140 is configured to trip at a set temperature. The set temperature corresponds to a temperature at which controller 63 deactivates heating element 130 to prevent overheating of heater assembly 100. The set temperature can be selected such that the heater assembly 100 does not overheat when there is low volume airflow through chamber 112 (e.g., when air handler 42 is off or when screen filter 44 or vent 49 are clogged). Thus, tripping of thermostat 140 when there is high volume airflow through chamber 112 (e.g., when air handler 42 is on and dryer appliance 10 is operating normally) can be undesirable and interfere with dryer appliance 10 operations.

As may be seen in FIG. 7, without the features for directing flow of heated air $F_h$ away from probe 142 of thermostat 140, thermostat 140 can trip when there is high volume airflow through chamber 112 despite dryer appliance 10 operating normally. Conversely, with the features for directing flow of heated air $F_h$ away from probe 142 of thermostat 140, thermostat 140 is hindered from tripping when there is high volume airflow through chamber 112 during normal operation of dryer appliance 10. Thus, the features for directing flow of heated air $F_h$ away from probe 142 of thermostat 140 can hinder undesirable tripping of thermostat 140 during high volume airflow through chamber 112 when dryer appliance 10 is operating normally.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heater assembly for an appliance, the heater assembly comprising:
   a housing that defines a chamber, said housing also defining an inlet and an outlet, the chamber of said housing extending from the inlet of said housing to the outlet of said housing, said housing also having an outer surface and an embossment with a distal portion, the embossment of said housing extending away from the outer surface of said housing such that the distal portion of the embossment is positioned away from the outer surface of said housing, the embossment of said housing having a sidewall that extends between and connects the outer surface of said housing and the distal portion of the embossment, the sidewall of the embossment defining an aperture;
   a heating element disposed within the chamber of said housing, said heating element configured for heating air that enters the chamber of said housing at the inlet of said housing in order to generate a flow of heated air that exits the chamber of said housing at the outlet of said housing; and
   a thermostat mounted to said housing and having a probe, the probe of said thermostat positioned within the chamber of said housing, the probe of said thermostat also positioned proximate the aperture of the embossment.

2. The heater assembly of claim 1, further comprising a louver positioned at the aperture of the embossment and extending into the chamber of said housing.

3. The heater assembly of claim 2, wherein said louver has a distal end, the distal end of said louver positioned within the chamber of said housing a first distance from the distal portion of the embossment, the probe of said thermostat having a distal part, the distal part of the probe positioned within the chamber of said housing a second distance from the distal portion of the embossment, the first distance being greater than the second distance.

4. The heater assembly of claim 2, wherein said louver has a distal end, the distal end of said louver positioned with the chamber of said housing such that said louver deflects the flow of heated air through the chamber of said housing away from the probe of said thermostat.

5. The heater assembly of claim 1, wherein the aperture of the embossment is disposed upstream of the probe of said thermostat relative to the flow of heated air through the chamber of said housing.

6. The heater assembly of claim 1, wherein said thermostat is mounted to the embossment of said housing.

7. The heater assembly of claim 6, further comprising at least one fastener, wherein said thermostat further comprises a support, the probe of said thermostat secured to the support of said thermostat, said at least one fastener extending through the support of said thermostat into the embossment of said housing.

8. The heater assembly of claim 1, further comprising means for urging a flow of air through the chamber of said housing.

9. The heater assembly of claim 1, wherein the distal portion of the embossment defines an opening, said thermostat extending through the opening of the distal portion into the chamber of said housing.

10. A heater assembly for an appliance, the heater assembly comprising:
    a housing that defines a chamber, said housing also defining an inlet and an outlet, the chamber of said housing extending from the inlet of said housing to the outlet of said housing, said housing further defining an aperture;
    a louver positioned at the aperture of said housing and extending into the chamber of said housing;
    a heating element disposed within the chamber of said housing, said heating element configured for heating air that enters the chamber of said housing at the inlet of said housing in order to generate a flow of heated air that exits the chamber of said housing at the outlet of said housing; and
    a thermostat mounted to said housing and having a probe, the probe of said thermostat positioned within the chamber of said housing, the probe of said thermostat also positioned proximate the aperture of said housing.

11. The heater assembly of claim 10, wherein said housing further comprises an outer surface and a projection with a distal portion, the projection of said housing extending away from the outer surface of said housing such that the distal portion of the projection is positioned away from the outer surface of said housing, the projection of said housing having a sidewall that extends between and connects the outer surface of said housing and the distal portion of the projection, the sidewall of the projection defining the aperture.

12. The heater assembly of claim 10, wherein said louver has a distal end, the distal end of said louver positioned within the chamber of said housing a first distance from said housing, the probe of said thermostat having a distal part, the distal part of the probe positioned within the chamber of said housing a second distance from said housing, the first distance being greater than the second distance.

13. The heater assembly of claim 10, wherein said louver has a distal end, the distal end of said louver positioned with the chamber of said housing such that said louver deflects the flow of heated air through the chamber of said housing away from the probe of said thermostat.

14. The heater assembly of claim 10, wherein the aperture of said housing is disposed upstream of the probe of said thermostat relative to the flow of heated air through the chamber of said housing.

15. The heater assembly of claim 10, wherein the probe of said thermostat is mounted to said housing.

16. The heater assembly of claim 15, further comprising at least one fastener, wherein said thermostat further comprises a support, the probe of said thermostat secured to the support of said thermostat, said at least one fastener extending through the support of said thermostat into said housing.

17. The heater assembly of claim 10, wherein said housing defines an opening, the probe of said thermostat extending through the opening of said housing into the chamber of said housing.

18. A heater assembly for an appliance, the heater assembly comprising:
   a housing that defines a chamber, said housing also defining an inlet and an outlet, the chamber of said housing extending from the inlet of said housing to the outlet of said housing;
a heating element disposed within the chamber of said housing, said heating element configured for heating air that enters the chamber of said housing at the inlet of said housing in order to generate a flow of heated air that exits the chamber of said housing at the outlet of said housing; and
   a thermostat mounted to said housing and having a probe, the probe of said thermostat positioned within the chamber of said housing; and
   means for directing the flow of heated air away from the probe of said thermostat.

* * * * *